(12) United States Patent
Warren et al.

(10) Patent No.: US 11,070,041 B2
(45) Date of Patent: Jul. 20, 2021

(54) EGRESS SEAL FITTING

(71) Applicant: UNITED TECHNOLOGIES CORPORATION, Farmington, CT (US)

(72) Inventors: Eli Cole Warren, Wethersfield, CT (US); Jerusalem Negash, Wethersfield, CT (US); Kevin A. Ford, Killingworth, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 262 days.

(21) Appl. No.: 16/365,388

(22) Filed: Mar. 26, 2019

(65) Prior Publication Data

US 2020/0313416 A1    Oct. 1, 2020

(51) Int. Cl.
*H02G 15/013* (2006.01)
*F02C 7/28* (2006.01)
*F01D 17/08* (2006.01)

(52) U.S. Cl.
CPC .......... *H02G 15/013* (2013.01); *F01D 17/08* (2013.01); *F02C 7/28* (2013.01)

(58) Field of Classification Search
CPC .......... H02G 15/013; F16L 5/02; F16L 5/028; F16L 5/027
USPC .............. 285/139.2, 141.1, 143.1, 220
See application file for complete search history.

(56) References Cited

U.S. PATENT DOCUMENTS

| 2,365,785 | A  |   | 12/1944 | Tinnerman |
|-----------|----|---|---------|-----------|
| 2,431,154 | A  | * | 11/1947 | Wikstrom ............ H02G 3/0658 |
|           |    |   |         | 285/149.1 |
| 2,788,992 | A  | * | 4/1957  | De Vienne ............ F16L 19/065 |
|           |    |   |         | 285/136.1 |
| 2,813,692 | A  |   | 11/1957 | Bremer et al. |
| 3,076,655 | A  |   | 2/1963  | Washburn, Jr. |
| 3,224,796 | A  |   | 12/1965 | Burkitt |
| 3,734,547 | A  | * | 5/1973  | Kojima ................. F16L 19/086 |
|           |    |   |         | 285/357 |
| 5,305,609 | A  |   | 4/1994  | Guinan et al. |
| 7,880,090 | B2 | * | 2/2011  | Gai ........................... F16L 5/02 |
|           |    |   |         | 174/152 G |
| 2014/0178185 | A1 | * | 6/2014 | Warren ............... H02G 15/013 |
|           |    |   |         | 415/182.1 |

FOREIGN PATENT DOCUMENTS

| CH | 202926  | 2/1939 |
| EP | 1209324 | 5/2002 |
| FR | 2567230 | 1/1986 |
| FR | 2567239 | 1/1986 |

OTHER PUBLICATIONS

European Patent Office, European Search Report dated Sep. 10, 2020 in Application No. 20163186.8.

* cited by examiner

*Primary Examiner* — Richard A Edgar
(74) *Attorney, Agent, or Firm* — Snell & Wilmer L.L.P.

(57) ABSTRACT

An egress seal fitting for a bulkhead penetration may comprise a housing, a driver configured to couple to the housing and define a cavity within the housing, and a seal member configured to be disposed within the cavity of the housing, wherein the driver is configured to pass a cable through the housing and apply pressure to the seal member.

11 Claims, 7 Drawing Sheets

EGRESS SEAL FITTING

STATEMENT OF GOVERNMENT RIGHTS

This invention was made with Government support awarded by the United States. The Government has certain rights in this invention.

FIELD

The disclosure relates generally to protective structures for aircraft cables and cable pathways, and particularly to pressure seal fittings for pressure compartments.

BACKGROUND

Aircraft cables such as gas turbine engine control and sensor cables may pass through various pressure compartments such as, for example, a pressure bulkhead or a compressor casing. Pressure losses at the penetration site may tend to degrade aircraft performance and benefit of a pressure seal fitting about the cable penetration. In industries and applications where weight and packaging is a significant design factor, such as in the aircraft industry fittings for cable penetration tend to be bulky or comprise a relatively high part count included many seal members. Ideally, a seal fitting will be comparatively light weight and compact.

SUMMARY

In various embodiments the present disclosure provides an egress seal fitting for a bulkhead penetration, comprising a housing, a driver configured to couple to the housing and define a cavity within the housing, and a seal member configured to be disposed within the cavity of the housing, wherein the driver is configured to pass a cable through the housing and apply pressure to the seal member.

In various embodiments, the housing comprises an annular cylindrical structure extending between a flanged portion and a base portion. In various embodiments, the housing comprises a first housing half and a second housing half. In various embodiments, wherein each of the first housing half and the second housing half comprise a corresponding externally threaded surface and a corresponding internally threaded surface. In various embodiments, the internally threaded surface of the first housing half and the internally threaded surface of the second housing half each extend only partially over the internal diameter of the annular cylindrical structure to define a driver stop. In various embodiments, the driver is configured to apply axial pressure to the seal member and expand the seal member radially between the housing and the cable. In various embodiments, the driver comprises an annular cylindrical drive portion and a head. In various embodiments, the drive portion comprises an externally threaded surface. In various embodiments, the driver comprises a first driver half and a second driver half. In various embodiments, the housing comprises an elongate base portion including a first driver cavity and a second driver cavity.

In various embodiments, the present disclosure provides a gas turbine engine, comprising a compressor section configured to compress a gas, a combustor section aft of the compressor section and configured to combust the gas, a turbine section aft of the combustor section and configured to extract work from the gas, a pressure bulkhead dividing a first pressure compartment from a second pressure compartment, wherein a pressure differential exists between the first pressure compartment and the second pressure compartment, and an egress seal fitting coupled to a penetration of the pressure bulkhead, comprising a housing, a driver coupled to the housing and defining a cavity within the housing, and a seal member disposed within the cavity of the housing and compressed by the driver, wherein the driver is configured to pass a penetrating member through the housing and expand the seal member radially between the housing and the penetrating member.

In various embodiments, the housing comprises an annular cylindrical structure extending between a flanged portion and a base portion. In various embodiments, the housing comprises a first housing half and a second housing half. In various embodiments, wherein each of the first housing half and the second housing half comprise a corresponding externally threaded surface and a corresponding internally threaded surface. In various embodiments, the internally threaded surface of the first housing half and the internally threaded surface of the second housing half each extend only partially over the internal diameter of the annular cylindrical structure to define a driver stop. In various embodiments, the driver comprises an annular cylindrical drive portion and a head. In various embodiments, the drive portion comprises an externally threaded surface. In various embodiments, the driver comprises a first driver half and a second driver half. In various embodiments, the housing comprises an elongate base portion including a first driver cavity and a second driver cavity.

In various embodiments, the present disclosure provides a method of sealing a pressure bulkhead penetration, the method comprising disposing a housing about a penetrating member passing through the pressure bulkhead penetration, coupling the housing to the pressure bulkhead penetration, disposing a seal member within a cavity of the housing, disposing a driver about the penetrating member and coupling the driver to the housing, and applying pressure to the seal member via the driver and expanding the seal member radially between the housing and the penetrating member in response to the pressure.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
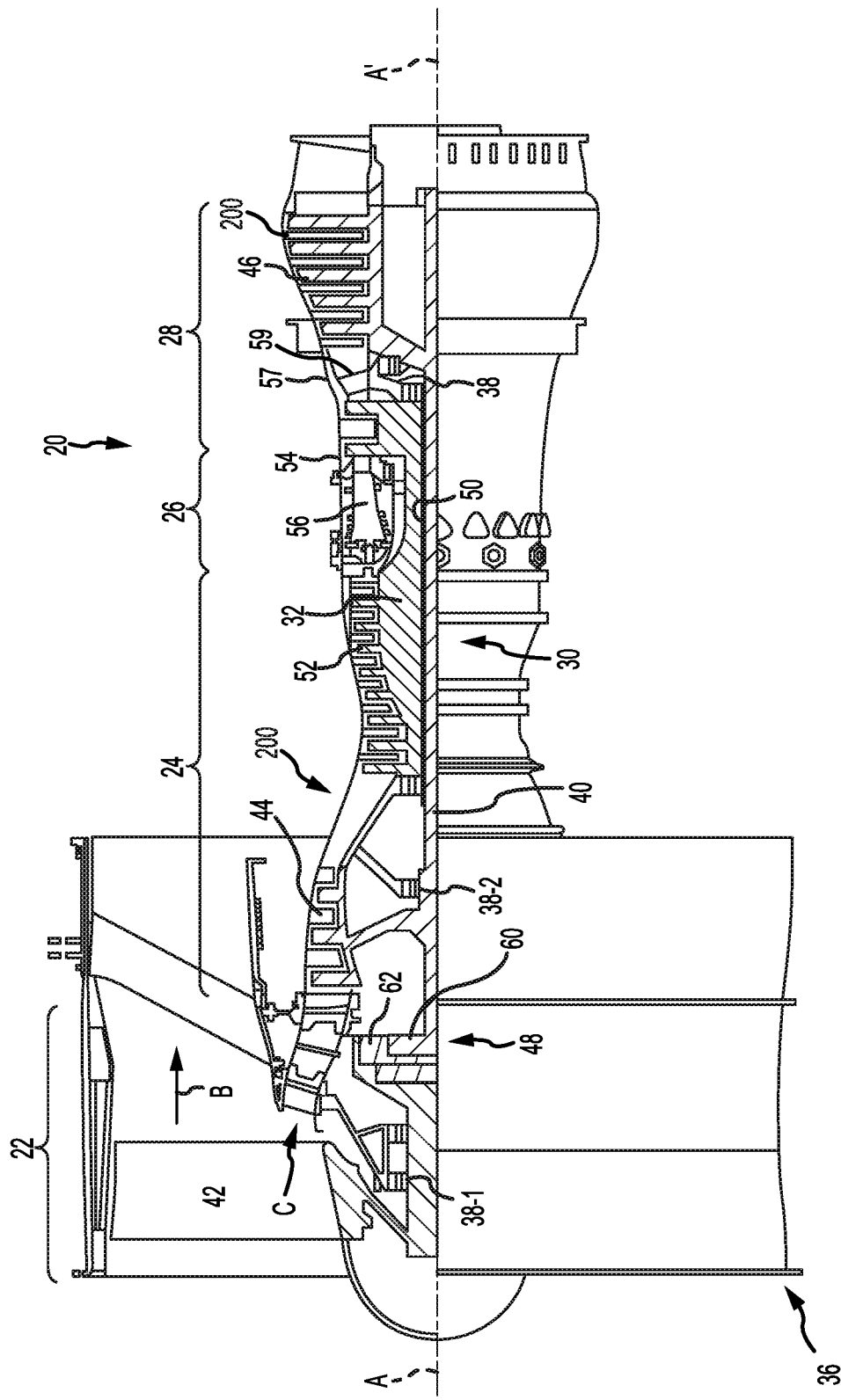
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including turbojet engines, a low-bypass turbofans, a high bypass turbofans, or any other gas turbine known to those skilled in the art.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which is associated with higher pressure ratios and higher temperatures in the HPC 52. These higher operating temperatures and pressure ratios may create operating environments that may cause thermal loads that are higher than the thermal loads encountered in conventional turbofan engines, which may shorten the operational life of current components.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support.

In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

Figure 2A:
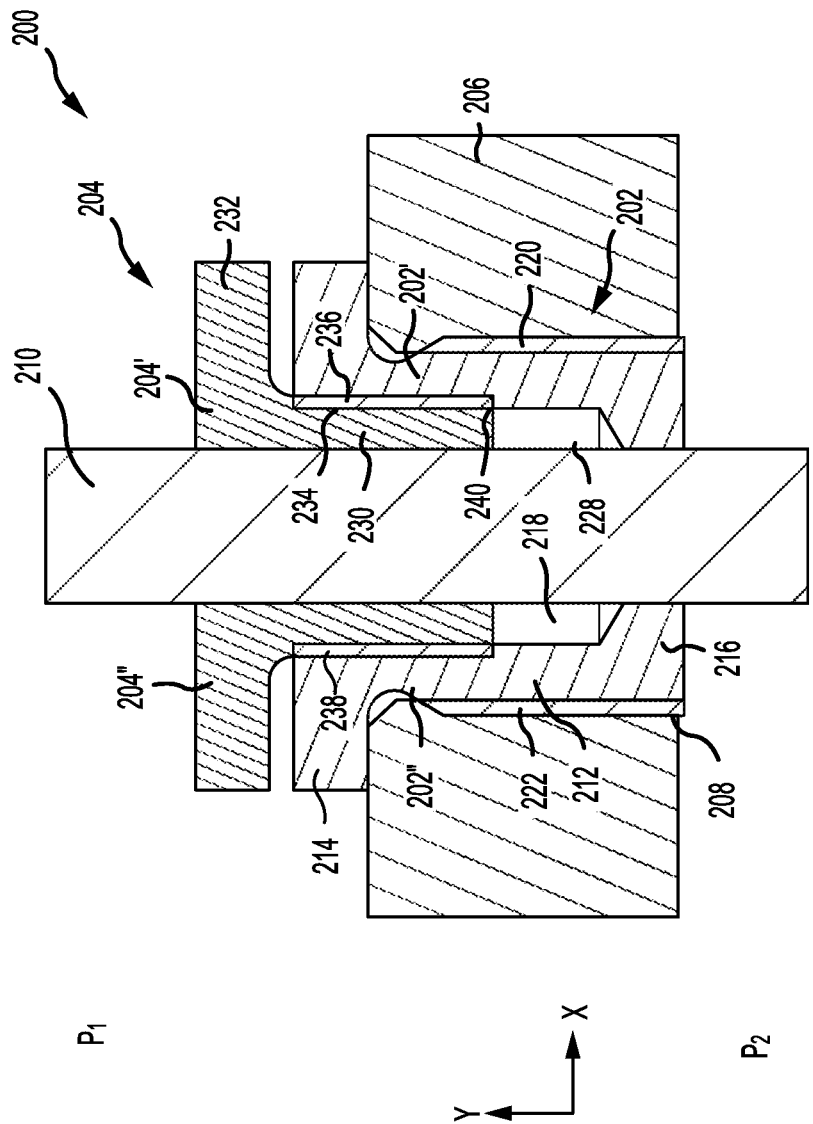
FIG. 2A illustrates an egress seal fitting, in accordance with various embodiments.

According to various embodiments and with reference to FIGS. 1 and 2A, an egress seal fitting 200 is shown in cross section through the XY-plane. Seal fitting 200 comprises a housing 202 and a driver 204. Housing 202 is coupled to a bulkhead 206, such as the HPC 52 case, at penetration 208. In various embodiments, bulkhead 206 divides a low pressure compartment at a first pressure P1 from a relatively high pressure compartment at a second pressure P2. In various embodiments, the pressure differential between P1 and P2 may be about 10,000 psi [69 Mpa] where about in this context means±10%. A penetrating member such as cable 210 or other penetrating member (e.g., a pipe, duct, optical fiber, etc.) penetrates the bulkhead at penetration 208. In various embodiments, the housing 202 may comprise an annular cylindrical structure 212 extending between a flanged portion 214 and a base portion 216. The driver 204 is coupled about the cable 210 and disposed within the housing 202 thereby defining a cavity 218 within the housing 202 proximate the base portion 216.

Figure 2B:
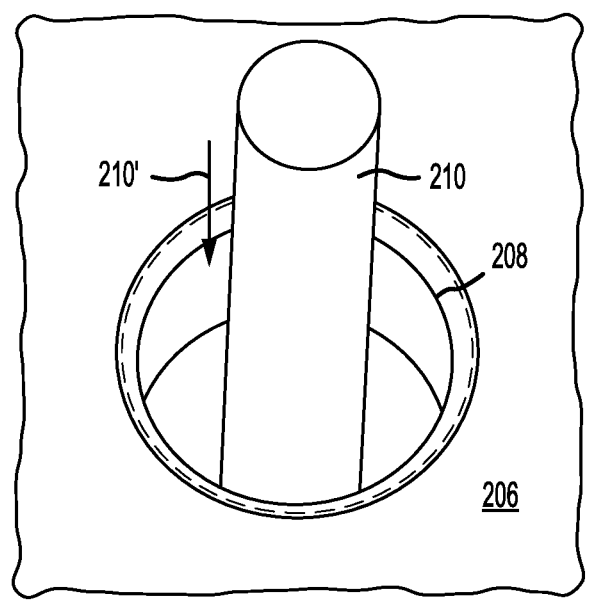
FIG. 2B illustrates a penetration for an egress seal fitting, in accordance with various embodiments.
Figure 2C:
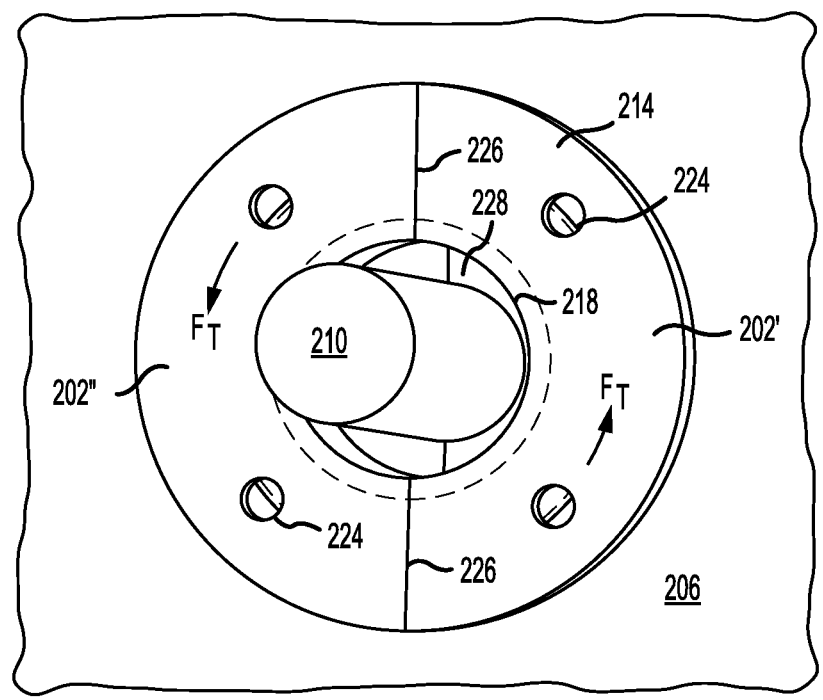
FIG. 2C illustrates a housing of an egress seal fitting, in accordance with various embodiments.
Figure 2D:
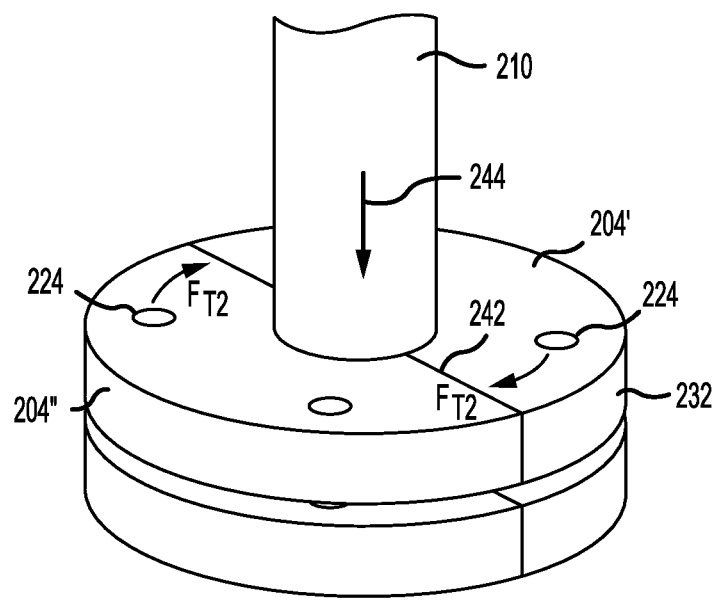
FIG. 2D illustrates an egress seal fitting, in accordance with various embodiments.

In various embodiments and with additional references to FIGS. 2B, 2C and 2D, the housing 202 is separated into a first housing half 202' and a second housing half 202". Cable 210 is passed through penetration 208 of bulkhead 206 (arrow 210'). The first housing half 202' and the second housing half 202" are inserted about the cable 210 into the penetration 208 and coupled to the bulkhead 206. In various embodiments, the penetration 208 may be threaded and the housing 202 may include corresponding threads. The first housing half 202' may be coupled to the bulkhead 206 by a first external threaded surface 220. In like regard, the second housing half 202" may be coupled to the bulkhead by a second external threaded surface 222. Flanged portion 214 may include tool interfaces 224 configured to enable the housing 202 to receive torque from a torque tool such as, for example, a spanner wrench. In various embodiments, torque $F_T$ may be applied at the tool interfaces 224 and the housing separation plane 226 may be configured to balance and/or distribute the torque between the halves (202', 202") and, in this regard, the housing 202 may behave as a monolithic structure. For example, housing 202 may be formed as a monolithic structure including a kerf portion at the housing separation plane 226 thereby tending to impart a relatively oblate geometry to the housing 202. In response to separating housing 202 into the halves (202', 202"), the kerf portion may be removed, tending thereby to impart a circular geometry to the housing 202 conducive to distributing the torque force $F_T$.

In various embodiments, a seal member 228 is inserted into the cavity 218 and disposed about the cable 210. The seal member may comprise one of a potting material (e.g, a room temperature vulcanization compound, a clay, an epoxy, etc.), an O-ring, a ferrule, or the like. In various embodiments, the driver 204 comprises an annular cylindrical drive portion 230 coupled to a head 232. The drive portion may comprise an externally threaded surface 234 extending along the external diameter of the drive portion. The externally threaded surface 234 may be configured to engage with respective first internally threaded surface 236 and second internally threaded surface 238 of the housing halves (202', 202"). In various embodiments, each of the first internally threaded surface 236 and second internally threaded surface 238 may extend only partially over the inner diameter of the annular cylindrical structure 212 to define a driver stop 240.

In similar fashion to housing 202, the driver 204 may be divided into a first driver half 204' and a second driver half 204". The first driver half 204' and the second driver half 204" are inserted about the cable 210 into the housing 202. Head 232 may include the tool interfaces 224' configured to enable the driver 204 to receive torque from a torque tool such as, for example, a spanner wrench. In various embodiments, second torque $F_{T2}$ may be applied at the tool interfaces 224' and the driver separation plane 242 may be configured to balance and/or distribute the torque between the halves (204', 204") and, in this regard, the driver 204 may behave as a monolithic structure. For example, driver 204 may be formed as a monolithic structure including a kerf portion at the driver separation plane 242 thereby tending to impart a relatively oblate geometry to the driver 204. In response to separating driver 204 into the halves (204', 204"), the kerf portion may be removed tending thereby to impart a circular geometry to the driver 204 conducive to distributing the second torque force $F_{T2}$. In response to the second torque force $F_{T2}$ the driver 204 may apply axial (along arrow 244) pressure to the seal member 228 tending to cause the seal member 228 to expand radially between the housing and the cable 210. In this regard, the expansion of the seal member 228 in response to the axial pressure generated by the driver 204 tends to effect a pressure seal between the cable 210 and the housing 202. In various embodiments, driver 204 may contact the driver stop 240 in response to the second torque force $F_{T2}$ and, in this regard, the pressure applied by the driver 204 to the seal member 228 may be limited to a desired pressure.

Figure 3A:
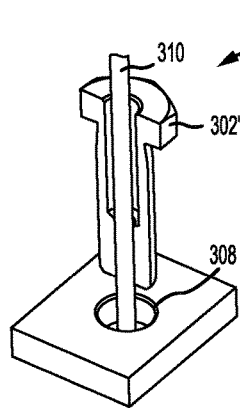
FIG. 3A illustrates an egress seal fitting, in accordance with various embodiments.
Figure 3B:
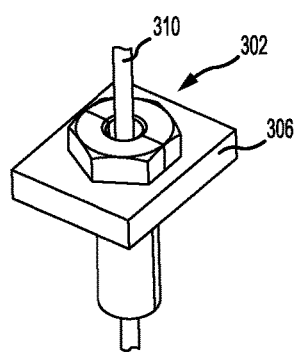
FIG. 3B illustrates an egress seal fitting, in accordance with various embodiments.
Figure 3C:
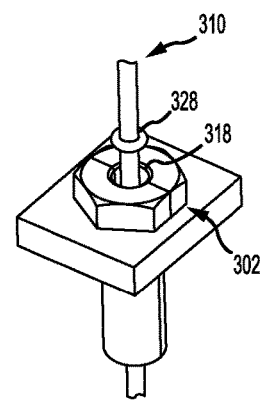
FIG. 3C illustrates an egress seal fitting, in accordance with various embodiments.
Figure 3D:
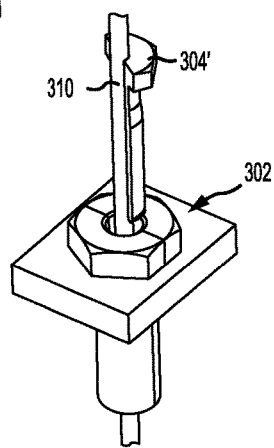
FIG. 3D illustrates an egress seal fitting, in accordance with various embodiments.
Figure 3E:
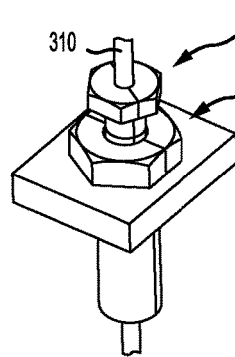
FIG. 3E illustrates an egress seal fitting, in accordance with various embodiments.

In various embodiments and with additional reference to FIGS. 3A through 3E, an egress seal fitting 300 is shown in various stages of assembly. Egress seal fitting 300 comprises features, geometries, construction, materials, manufacturing techniques, and/or internal components similar to egress seal fitting 300 but having a hexagonal head and flanged portion. FIG. 3A illustrates a housing half 302' disposed about a cable 310 prior to insertion at a penetration 308. FIG. 3B illustrates the housing 302 about the cable 310 and coupled to the bulkhead 306 at the penetration 308. FIG. 3C illustrates the seal member 328 disposed about the cable 310 prior to insertion into the cavity 318 of the housing 302. FIG. 3D illustrates a driver half 304' disposed about the cable 310 prior to insertion within the housing 302. FIG. 3E illustrates the driver 304 torqued and coupled to the housing 302 to generate a seal about the cable 310.

Figure 4:
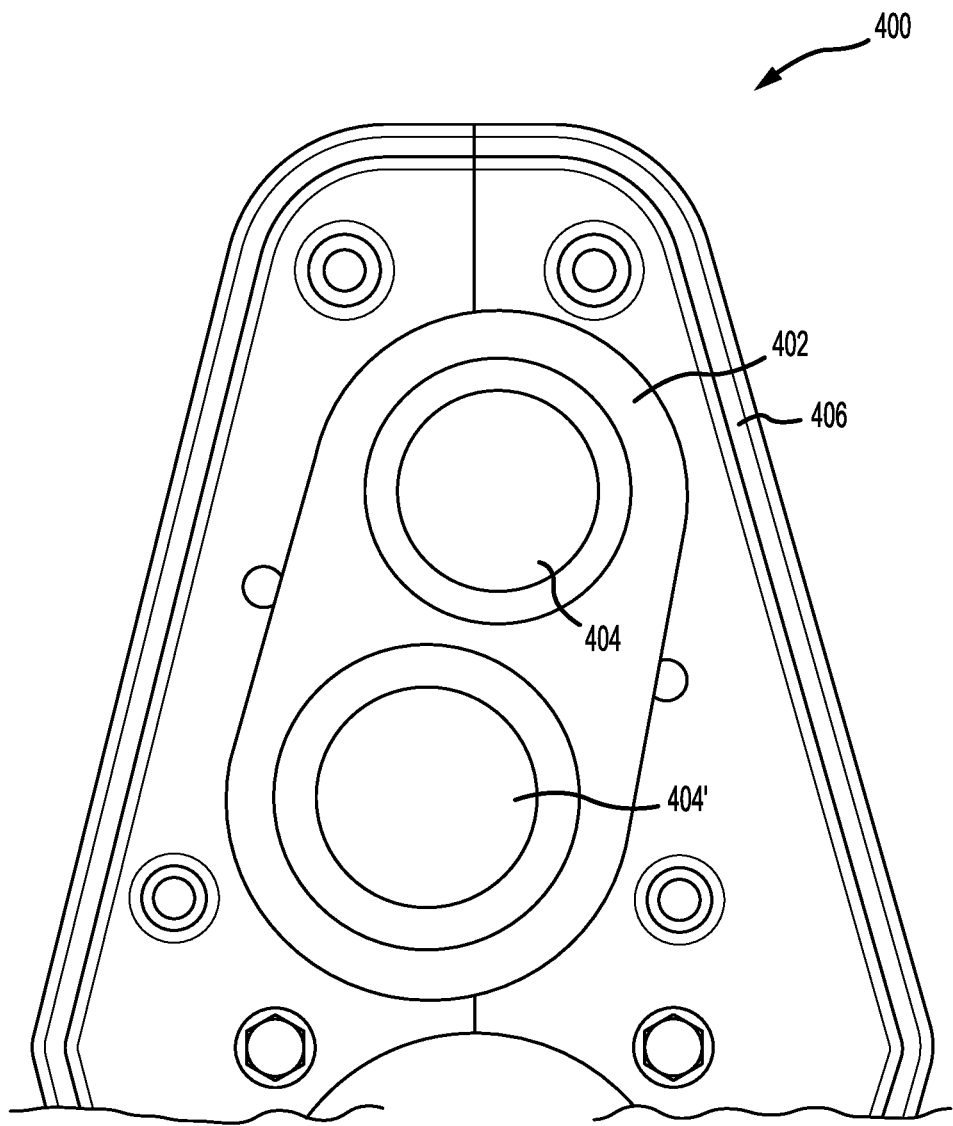
FIG. 4 illustrates a housing for an egress seal fitting, in accordance with various embodiments.

In various embodiments and with additional reference to FIG. 4, a housing 400 for an egress seal fitting is illustrated. Housing 400 comprises features, geometries, construction, materials, manufacturing techniques, and/or internal components similar to housing 202. Housing 400 differs in comprising an elongate base portion 402. In various embodiments, the elongate base portion 402 may be a monolithic structure coupled to the bulkhead 406. The elongate base portion 402 may comprise a plurality of driver cavities such as first driver cavity 404 and second driver cavity 404'. Each of the driver cavities may be configured to receive a cable and couple with a driver such as, for example, driver 204 or driver 304.

Figure 5:
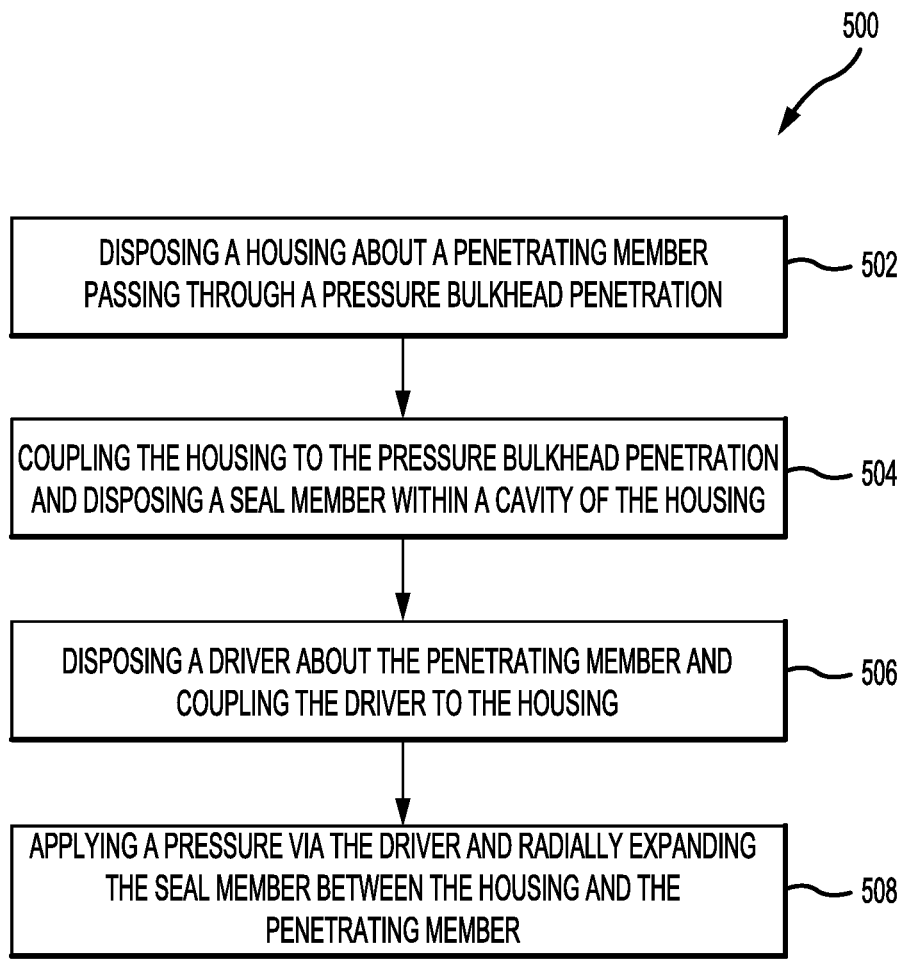
FIG. 5 illustrates a method of manufacturing a CMC structure, in accordance with various embodiments.

With additional reference to FIG. 5, a method 500 of sealing a pressure bulkhead penetration may comprise disposing a housing about a penetrating member passing through the pressure bulkhead penetration (step 502). Method 500 includes coupling the housing to the pressure bulkhead penetration and disposing a seal member within a cavity of the housing (step 504). Method 500 includes disposing a driver about the penetrating member and coupling the driver to the housing (step 506). Method 500 includes applying a pressure to the seal member via the driver and expanding the seal member radially between the housing and the penetrating member in response to the pressure (step 508).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An egress seal fitting for a bulkhead penetration, comprising:
    a housing separable into a first housing half and a second housing half, wherein the housing comprises an annular cylindrical structure extending between a flanged portion and a base portion;
    a driver configured to couple to the housing in response to being inserted therewithin, wherein the driver comprises an annular cylindrical drive portion and a head, wherein the driver is separable into a first driver half and a second driver half, wherein the driver defines a first driver cavity within the housing; and
    a seal member disposed within the driver cavity of the housing, wherein the driver is configured to pass a penetrating member through the housing between the first driver half and the second driver half and apply pressure to the seal member,
    wherein the flanged portion of the housing includes a tool interface defined by a plurality of penetrations extending through the flanged portion, wherein the plurality of penetrations are arranged circumferentially about the first driver cavity and radially outward thereof, and wherein each penetration of the plurality of penetrations are circumferentially equidistant.

2. The egress seal fitting of claim 1, wherein each of the first housing half and the second housing half comprise a corresponding externally threaded surface and a corresponding internally threaded surface.

3. The egress seal fitting of claim 2, wherein the internally threaded surface of the first housing half and the internally threaded surface of the second housing half each extend only partially over an internal diameter of the annular cylindrical structure to define a driver stop.

4. The egress seal fitting of claim 1, wherein the driver is configured to apply an axial pressure to the seal member and expand the seal member radially between the housing and the penetrating member.

5. The egress seal fitting of claim 1, wherein the drive portion comprises an externally threaded surface.

6. A gas turbine engine, comprising:
    a compressor section configured to compress a gas;
    a combustor section aft of the compressor section and configured to combust the gas;
    a turbine section aft of the combustor section and configured to extract work from the gas;
    a pressure bulkhead dividing a first pressure compartment from a second pressure compartment, wherein a pressure differential exists between the first pressure compartment and the second pressure compartment; and
    an egress seal fitting coupled to a penetration of the pressure bulkhead, comprising:
    a housing separable into a first housing half and a second housing half, wherein the housing comprises an annular cylindrical structure extending between a flanged portion and a base portion;
    a driver coupled to the housing, wherein the driver comprises an annular cylindrical drive portion and a head, wherein the driver is separable into a first driver half and a second driver half, wherein the driver defines a first driver cavity within the housing; and
    a seal member disposed within the driver cavity of the housing and compressed by the driver, wherein the driver is configured to pass a penetrating member between the first driver half and the second driver half through the housing and expand the seal member radially between the first driver cavity of the housing and the penetrating member, wherein the flanged portion of the housing includes a tool interface defined by a plurality of penetrations extending through the flanged portion, wherein the plurality of penetrations are arranged circumferentially about the first driver cavity and radially outward thereof, and wherein each penetration of the plurality of penetrations are circumferentially equidistant.

7. The gas turbine engine of claim 6, wherein each of the first housing half and the second housing half comprise a corresponding externally threaded surface and a corresponding internally threaded surface.

8. The gas turbine engine of claim 7, wherein the internally threaded surface of the first housing half and the internally threaded surface of the second housing half each extend only partially over an internal diameter of the annular cylindrical structure to define a driver stop.

9. The gas turbine engine of claim 6, wherein the drive portion comprises an externally threaded surface.

10. The gas turbine engine of claim 6, wherein the housing comprises an elongate base portion including the first driver cavity and a second driver cavity.

11. A method of sealing a pressure bulkhead penetration, the method comprising:

disposing a housing about a penetrating member passing through the bulkhead penetration, wherein the housing comprises a first housing half and a second housing half, wherein the housing comprises an annular cylindrical structure extending between a flanged portion and a base portion;

coupling the housing to the pressure bulkhead penetration, wherein coupling comprises applying a torque to the housing at the flanged portion via a tool interface, wherein the tool interface is defined by a plurality of penetrations extending through the flanged portion, wherein the plurality of penetrations are arranged circumferentially about a cavity of the housing and radially outward thereof, and wherein each penetration of the plurality of penetrations are circumferentially equidistant;

disposing a seal member within the cavity of the housing;

disposing a driver about the penetrating member and coupling the driver to the housing and within the cavity; and applying a pressure to the seal member via the driver and expanding the seal member radially between the housing and the penetrating member in response to the pressure, wherein the driver comprises an annular cylindrical drive portion and a head, wherein the driver comprises a first driver half and a second driver half, wherein the driver defines a driver cavity within the housing.

* * * * *